3,719,554
Patented Mar. 6, 1973

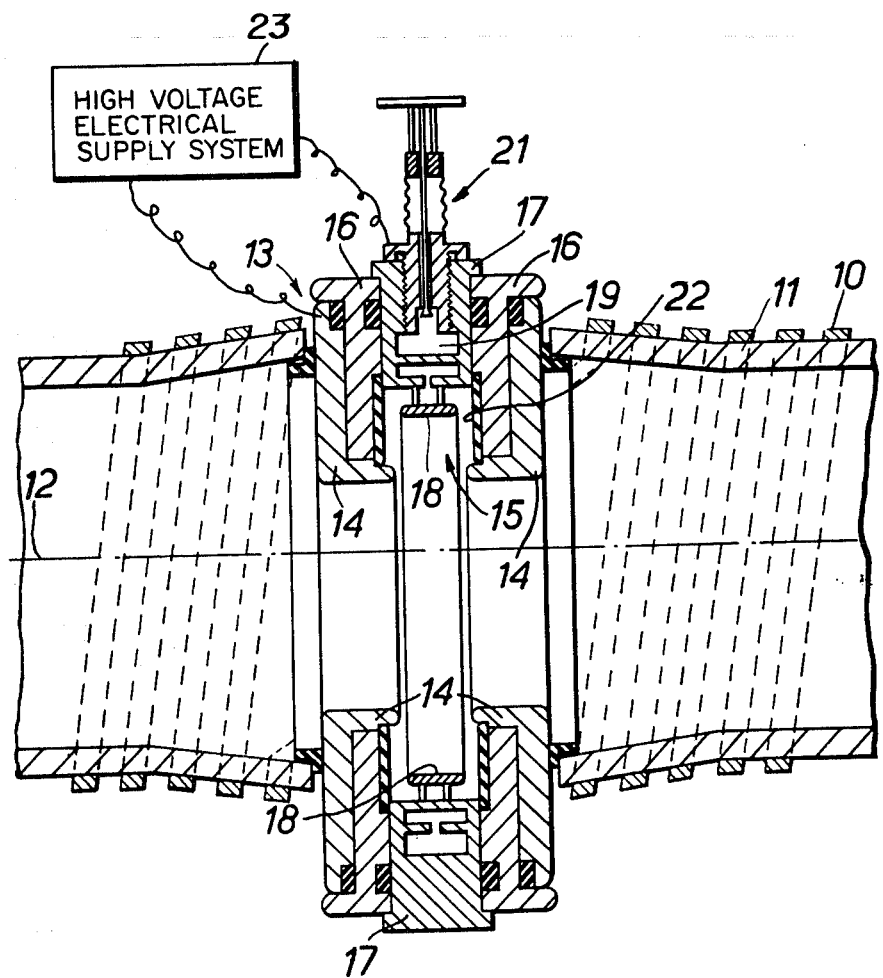

3,719,554
HALL CURRENT ACCELERATOR ADAPTED FOR INJECTION OF IONS INTO PLASMA CONFINEMENT SYSTEM
Herbert Charles Cole, Abingdon, England, assignor to United Kingdom Atomic Energy Authority, London, England
Filed Sept. 11, 1970, Ser. No. 71,565
Claims priority, application Great Britain, Sept. 17, 1969, 45,927/69
Int. Cl. G21b 1/00
U.S. Cl. 176—3     6 Claims

ABSTRACT OF THE DISCLOSURE

Gas is introduced into an accelerator which operates on the principle of a Hall accelerator. The anode and cathode are concentric annuli with the cathode innermost. The magnetic field is parallel to the axis. The gas is ionised in the accelerator and the ions accelerated radially inwardly towards the axis. The arrangement is especially suitable for injection of ions into a Stellarator type of plasma confinement system since the magnetic field of the confinement system may be used as the magnetic field of the accelerator. This reduces the problem of getting ions from outside to the inside of the magnetic trap.

BACKGROUND OF THE INVENTION

The invention relates to the generation of plasma and more particularly to the generation and injection of plasma into a device for containing the plasma.

For the generation of thermonuclear power, for example, it is necessary to devise means for confining a hot plasma of thermonuclear fuel without the plasma coming into contact with material boundaries. Numerous systems have been developed for confining plasmas by magnetic fields, or by magnetic and electric fields combined and these systems have been employed in experiments in research which has the ultimate goal of achieving economic generation of thermonuclear power.

A further requirement of a reactor for generating thermonuclear power is apparatus for generating the "start up" plasma and injecting the plasma into the plasma confinement system of the reactor.

SUMMARY OF THE INVENTION

The present invention provides apparatus for use with a plasma confinement system including means for generating a magnetic field within a containment vessel, which apparatus comprises a plasma source with an anode and a cathode within the containment vessel and spaced apart in a direction generally perpendicular to the magnetic lines of force of the plasma confinement system when in operation, the plasma source further comprising an inlet valve for admitting gas into the region of the anode and a source of high electrical voltage connected across the anode and cathode, the magnitude of the applied voltage being selected, in relation to the perpendicular magnetic field, to impose a circulatory motion upon the electrons whereof the Larmor radius is smaller than the separation of the anode and cathode, whilst the Larmor radius for the ions is larger than the separation of the anode and cathode.

Preferably the anode and the cathode are concentric with their axis parallel to the said magnetic lines of force and the anode is outside the cathode. Preferably the plasma confinement system is of the Stellarator type in which the containment vessel is toroidal and has solenoidal windings thereon for generating a magnetic field parallel with the minor axis of the toroid. In this case, the anode and cathode of the plasma source are arranged concentrically within the toroidal vessel with their axis coincident with the minor axis of the toroid and the anode outside the cathode. The annular region between the anode and cathode is enclosed except for an annular opening in the cathode facing the central axis.

Means are provided for applying a high electrical voltage across the anode and cathode and it is important that the electrical voltage and the electrical field it produces are so related to the perpendicular magnetic field that the Larmor radius of electrons is smaller than the separation of the anode and cathode, whilst the Larmor radius of the ions is larger than the separation of the anode and cathode.

Preferably, a further inlet valve is provided for admitting material, for example in the form of a powder, into the region between the anode means and the cathode means.

BRIEF DESCRIPTION OF THE DRAWING

A specific construction of apparatus embodying the invention will now be described by way of example and with reference to the accompanying drawing, which is a sectional view of part of the apparatus.

DESCRIPTION OF PREFERRED EMBODIMENT

The section shown in the drawing is a part section parallel with the minor axis 12 of a toroidal vessel 11 of a Stellarator type of plasma confinement system.

A magnetic field, the lines of force of which are parallel to the minor axis 12, for confining the plasma is generated by solenoidal windings illustrated diagrammatically at 10 upon the toroidal vessel 11.

The plasma source of this example comprises an ion accelerator 13 working on the same principle as a Hall accelerator. The accelerator 13 comprises an annular stainless steel cathode 14 of channel section with a gap 15 in the bottom of the channel. The gap 15 provides an annular opening facing the axis 12.

An annular insulator 16 separates the cathode 14 from an annular core structure 17 which supports annular anode 18 and contains an annular cavity 19 which communicates with the interior of the toroidal vessel 11 from behind the anode 18. The region between the cathode 14 and the anode 18 is lined with a Pyrex iinsulator 22.

A source of gas, which is to be ionised is connected to the cavity 19 via a fast acting valve 21.

A high voltage electrical energy supply system, illustrated diagrammatically at 23 is connected across the anode 18 and cathode 14.

Means (not shown) are provided for cooling the cathode 14.

The high voltage electrical energy supply system 23 includes a capacitor bank and, in operation a undirectional current pulse is supplied by the capacitor bank at 10 kilovolts, 45 kilojoules or higher energy and a volume of hydrogen gas is fed into the accelerator by the fast acting valve 21. The location of the anode 18 and the communicating passageways behind the anode 18 helps to distribute the gas uniformly around the annulus. The gas is ionised by the electric discharge.

The radial electric field set up between the anode and cathode is arranged to be so related to the axial magnetic field that the Larmor radius of the electrons in the ionised gas is less than the separation of the anode and cathode whilst the Larmor radius of the ions is greater than the separation of the anode and cathode.

Consequently the ions can move relatively unimpeded through the system, while the electrons, which are prevented from moving directly towards the anode by the axial magnetic field, move in an azimuthal direction as a result of the crossed electric and magnetic fields. This drift of the electrons constitutes a Hall current which interacts with the axial magnetic field to produce a magnetomotive force acting in the same direction as the initial electric field.

The Hall current consequently has the effect of accelerating the ions into the region of the minor axis of the torodial vessel 11.

A requirement of the arrangement is that the plasma should be effectively collisionless in the accelerator, that is $W_e \tau_e > 1$ where $W_e$ and $\tau_e$ are the electron gyrofrequency and collision time respectively.

It will be appreciated that the apparatus makes direct use of the magnetic field of the plasma confinement system for the generation of the Hall current in the ion accelerator. In this way, the problem of getting plasma from the outside to the inside of the magnetic trap is reduced.

In principle, the apparatus is capable of continuous operation so that the quantity of plasma produced is limited by power supply and technological problems such as cathode corrosion, cathode cooling, etc.

The ions are accelerated through a background of electrons so that the space charge limitation of conventional ion sources is voided or reduced.

The structure of the plasma source of this example has potential applications outside the field of plasma confinement systems. For example, the accelerator 13 may be incorporated in a cylindrical vessel provided with means siimlar to the solenoid windings 10 for generating an axial magnetic field. If a further inlet valve is provided, communicating with the space between the anode and cathode, powdered material may be introduced. Such powdered material would be ionised by the electrons and the ions accelerated radially towards the axis. Such an arrangement has application, for example, to coating articles fed axially through the cylindrical vessel.

The invention is not restricted to the details of the foregoing example.

I claim:

1. Apparatus for use with a plasma confinement system including means for generating a magnetic field within a containment vessel, which apparatus comprises a plasma source with an anode and a cathode within the containment vessel and spaced apart in a direction generally perpendicular to the magnetic lines of force of the plasma confinement system when in operation, the plasma source further comprising an inlet valve for admitting gas into the region of the anode and a source of high electrical voltage connected across the anode and cathode, the magnitude of the applied voltage being selected, in relation to the perpendicular magnetic field, to impose circulatory motion upon the electrons whereof the Larmor radius is smaller than the separation of the anode and cathode, whilst the Larmor radius for the ions is larger than the separation of the anode and cathode.

2. Apparatus as claimed in claim 1, wherein the anode and the cathode are concentric with their axis parallel to the said magnetic lines of force and the anode is outside the cathode.

3. Apparatus as claimed in claim 1, wherein the plasma confinement system is of the Stellarator type in which the containment vessel is toroidal and has solenoidal windings thereon for generating a magnetic field parallel with the minor axis of the toroid.

4. Apparatus as claimed in claim 1, wherein the anode and cathode of the plasma source are arranged concentrically within the toroidal vessel wih their axis coincident with the minor axis of the toroid and the anode outside the cathode.

5. Apparatus as claimed in claim 1, wherein the annular region between the anode and cathode is enclosed except for an annular opening in the cathode facing the central axis.

6. Apparatus as claimed in claim 1, wherein a further inlet valve is provided for admitting material, for example in the form of a powder, into the region between the anode means and the cathode means.

References Cited
UNITED STATES PATENTS

| | | | |
|---|---|---|---|
| 3,388,291 | 6/1968 | Cann | 313——161 X |
| 3,113,088 | 12/1963 | Josephson | 313—161 X |
| 3,009,080 | 11/1961 | Loos | 176—8 |
| 3,226,592 | 12/1965 | Gough et al. | 313—161 UX |
| 3,558,960 | 1/1971 | Hofmann | 313—157 X |

ALFRED L. BRODY, Primary Examiner

U.S. Cl. X.R.

176—5, 8; 313—157, 161; 315—111; 328—233